United States Patent [19]

Kutsch et al.

[11] Patent Number: 5,756,183
[45] Date of Patent: May 26, 1998

[54] MICROEMBOSSED PAPER, MICROEMBOSSABLE COATING FOR PAPER SUBSTRATES AND A PROCESS FOR MICROEMBOSSING PAPER SUBSTRATES

[75] Inventors: Wilhelm P. Kutsch, Kensington, N.H.; Christopher C. Christuk, Newbury; Dominick E. Casalena, Newburyport, both of Mass.

[73] Assignee: Foilmark Manufacturing Corporation, Newburyport, Mass.

[21] Appl. No.: 763,996

[22] Filed: Dec. 13, 1996

[51] Int. Cl.$^6$ .................. B32B 15/08; B32B 27/10; B32B 31/14; B32B 3/00
[52] U.S. Cl. .................. 428/156; 428/172; 428/457; 428/460; 428/461; 428/465; 428/498; 428/537.5; 427/277; 427/355; 427/367; 427/371
[58] Field of Search .................. 428/457, 460, 428/461, 465, 498, 537.5, 164, 165, 156, 172; 427/277, 355, 367, 371

[56] References Cited

U.S. PATENT DOCUMENTS

| | | | |
|---|---|---|---|
| 2,975,074 | 3/1961 | Jankens et al. | 117/76 |
| 3,463,659 | 8/1969 | Dragoon et al. | 117/71 |
| 3,655,608 | 4/1972 | Guenther et al. | 260/37 N |
| 3,981,762 | 9/1976 | Davis et al. | 156/322 |
| 3,996,394 | 12/1976 | Harris | 427/54 |
| 4,259,285 | 3/1981 | Baumgartl et al. | 264/284 |
| 4,363,851 | 12/1982 | Mishina et al. | 428/333 |
| 4,409,063 | 10/1983 | Brown | 156/542 |
| 4,579,776 | 4/1986 | Fock et al. | 428/332 |
| 4,599,275 | 7/1986 | Hayashi et al. | 428/461 |
| 4,602,265 | 7/1986 | Philpott et al. | 346/210 |
| 4,609,574 | 9/1986 | Keryk et al. | 427/407.1 |
| 4,856,857 | 8/1989 | Takeuchi et al. | 350/36 |
| 4,913,858 | 4/1990 | Miekka et al. | 264/1.3 |
| 5,003,915 | 4/1991 | D'Amato et al. | 118/46 |
| 5,083,850 | 1/1992 | Mallik et al. | 359/1 |
| 5,158,853 | 10/1992 | Sasaki et al. | 430/124 |
| 5,164,227 | 11/1992 | Miekka et al. | 427/162 |
| 5,182,069 | 1/1993 | Wick | 264/210.2 |
| 5,229,217 | 7/1993 | Holzer | 428/503 |
| 5,292,781 | 3/1994 | Floyd | 524/17 |
| 5,351,142 | 9/1994 | Cueli | 359/2 |
| 5,358,790 | 10/1994 | Rüf et al. | 428/486 |
| 5,362,802 | 11/1994 | Amici et al. | 525/57 |
| 5,368,891 | 11/1994 | Sagara et al. | 427/258 |
| 5,387,013 | 2/1995 | Yamauchi et al. | 283/86 |
| 5,393,099 | 2/1995 | D'Amato | 283/91 |
| 5,426,520 | 6/1995 | Kakae et al. | 359/2 |
| 5,456,949 | 10/1995 | Albrinck et al. | 427/411 |
| 5,464,690 | 11/1995 | Boswell | 428/334 |
| 5,464,710 | 11/1995 | Yang | 430/1 |
| 5,656,360 | 8/1997 | Faykish et al. | 428/195 |

*Primary Examiner*—Paul J. Thibodeau
*Assistant Examiner*—Holly C. Rickman
*Attorney, Agent, or Firm*—Sughrue, Mion, Zinn, Macpeak & Seas, PLLC

[57] ABSTRACT

A microembossable coating for paper substrates containing: (i) a cross-linked sealing layer provided on the paper substrate, wherein the cross-linked sealing layer has a glass transition temperature above an embossing temperature; (ii) a microembossable layer provided on the cross-linked sealing layer, wherein the microembossable layer comprises, in admixture, a) a cyclohexanone aldehyde resin, b) chlorinated rubber; c) a vinyl terpolymer resin and d) an antiblocking aid; (iii) an image intensifying layer provided on the microembossable layer; and (iv) a protective layer provided on the image intensifying layer. Optionally, the microembossable layer may contain: a) at least one of methyl methacrylate or ethyl methacrylate, b) polyvinyl acetate maleate copolymer, c) carboxyl vinyl terpolymer, and d) an antiblocking aid. A microembossed paper and process for microembossing paper substrates utilizes the above coatings.

62 Claims, No Drawings

MICROEMBOSSED PAPER, MICROEMBOSSABLE COATING FOR PAPER SUBSTRATES AND A PROCESS FOR MICROEMBOSSING PAPER SUBSTRATES

FIELD OF THE INVENTION

This invention relates to a microembossed paper, a microembossable coating for paper substrates and a process for microembossing paper substrates.

BACKGROUND OF THE INVENTION

The microembossing process is essentially a replication process of a holographic image or diffraction pattern. This process allows for the decoration of cellulosic webs with diffraction or holographic patterns. Such webs can be metallized, sheeted, and laminated to paperboard or applied directly to the end use. Packaging and security items are the typical application areas for microembossed paper.

In general, the embossing process is accomplished using high, uniform temperatures and pressures. The web is pre-heated and passed, under high pressure, between a roller covered with either nickel or plastic shims bearing the holographic or diffraction image and a backing roller consisting of a hard material such as steel or Vespel®. This process, known as "hard" embossing, requires a robust substrate because of the extreme stresses generated. Examples of "hard" embossing may be found in U.S. Pat. Nos. 4,913,858 and 5,164,227.

As set forth in U.S. Pat. Nos. 3,463,659 and 3,655,608, the current practice is to begin with a cellulosic web which has been smoothed during production. Clay coated or super-calendered papers are typically chosen. Despite the use of smoothed paper substrates, the final product often exhibits a grainy appearance due to the surface features and absorption factor inherent in paper.

In the next step, a coating is applied to the smoothed surface. The coating may be extruded or applied from a solvent or water matrix via gravure, rod, or other coating methods. Extrusion coats typically consist of thermosensitive materials such as polyvinyl chloride, polyethylene, polypropylene, polystyrene, or similar materials. Such coats necessitate the presence of an extruder, either in-line or off-line. Solvent or water borne coats usually consist of polystyrene or styrenated acrylics containing a small amount of polysiloxane to retard offsetting of the coating onto the embossing die. Such coatings are heated to their softening point immediately prior to embossing.

When coatings are applied to paper, adhesion among the layers is often inadequate. As set forth in U.S. Pat. No. 4,363,851, this characteristic can lead to delamination of one or more coatings once the final product has been processed into, for example, a carton. While the invention claimed in U.S. Pat. No. 4,363,851 may be adequate for unembossed, metallized paper, the enhancements inherent in holographically decorated products add much value.

Metallization is typically accomplished using aluminum, but examples of transparent and semi-transparent coatings such as tin tungsten oxide are known. U.S. Pat. No. 5,351,142 describes an especially thick deposit of tin tungsten oxide on a polyester web of between 5,000 and 10,000Å. Vacuum vapor deposition of especially thick coatings is a time-consuming and inefficient technique.

Current practice requires the embossing of pre-smoothed paper stock (U.S. Pat. No. 4,913,858), the use of plastic webs rather than paper, or laminating or transferring holograms or diffraction images to another substrate (U.S. Pat. Nos. 4,856,857 and 5,464,690). In no case has raw, unsmoothed paper stock been employed. Typically, the embossing process requires very high pressures (U.S. Pat. No. 4,913,858) which necessitate especially robust materials.

SUMMARY OF THE INVENTION

Accordingly, the objects of this invention include the following: 1) provide a series of coatings to be used for constructing an embossed, metallized paper material which include a fast-curing thermoset sealing layer and a thermosensitive embossable layer requiring low pressure for embossing; 2) accomplish such holographic or diffraction embossing without an extruded coating; 3) eliminate the need for clay coated, supercalendered, or similarly smoothed paper stock prior to coating; 4) achieve coatings which can be imparted with strong, vivid diffractive or holographic images without the need for hard embossing; 5) obtain images which do not have a grainy appearance; 6) provide a means for creating a metallized product which will not be subject to metal oxidation; 7) impart color to the material without obscuring the diffractive or holographic image; and 8) achieve excellent adhesion among the coatings such that no coating or combination of coatings can be removed from the paper without tearing the paper itself.

According to a first embodiment of the present invention, a microembossable coating for paper substrates contains: (i) a cross-linked sealing layer provided on the paper substrate, wherein the cross-linked sealing layer has a glass transition temperature above an embossing temperature; (ii) a microembossable layer provided on the cross-linked sealing layer, wherein the microembossable layer contains, in admixture, a) a cyclohexanone aldehyde resin, b) chlorinated rubber, c) a vinyl terpolymer resin and d) an antiblocking aid; (iii) an image intensifying layer provided on the microembossable layer; and (iv) a protective layer provided on the image intensifying layer.

According to a second embodiment of the invention, a microembossable coating for paper substrates contains a similar cross-linked sealing layer, image intensifying layer and protective layer as in the first embodiment, but discloses, in admixture, the following microembossable layer: a) at least one member selected from the group consisting of methyl methacrylate and ethyl methacrylate, b) a polyvinyl acetate maleate copolymer, c) a carboxyl vinyl terpolymer, and d) an antiblocking aid.

According to a third embodiment of the present invention, a microembossed paper comprises a microembossed coating provided on a paper substrate, wherein the microembossed coating contains: (i) a cross-linked sealing layer provided on the paper substrate, wherein the cross-linked sealing layer has a glass transition temperature above an embossing temperature; (ii) a microembossed layer provided on the cross-linked sealing layer, wherein the microembossed layer comprises, in admixture, a) a cyclohexanone aldehyde resin, b) chlorinated rubber, c) a vinyl terpolymer resin and d) an antiblocking aid; (iii) an image intensifying layer provided on the microembossed layer; and (iv) a protective layer provided on the image intensifying layer.

According to a fourth embodiment of the invention, a microembossed paper comprises a microembossed coating provided on a paper substrate, wherein the microembossed coating comprises a similar cross-linked sealing layer, image intensifying layer and protective layer as the third embodiment, but further discloses, in admixture, the following microembossed layer: a) at least one member selected from the group consisting of methyl methacrylate and ethyl methacrylate, b) a polyvinyl acetate maleate copolymer, c) a carboxyl vinyl terpolymer, and d) an antiblocking aid.

Finally, the present invention is directed to a process for microembossing paper substrates comprising the steps of: (i) applying a cross-linked sealing layer to a paper substrate, wherein the cross-linked sealing layer has a glass transition temperature above an embossing temperature; and (ii) applying a microembossable layer on the cross-linked sealing layer, wherein the microembossable layer comprises, in admixture, a) a cyclohexanone aldehyde resin, b) chlorinated rubber, c) a vinyl terpolymer resin and d) an antiblocking aid; or the microembossable layer comprises, in admixture: a) at least one member selected from the group consisting of methyl methacrylate and ethyl methacrylate, b) a polyvinyl acetate maleate copolymer, c) a carboxyl vinyl terpolymer, and d) an antiblocking aid. An image intensifying layer and protective layer are subsequently added thereto, and the embossing step is conducted after applying the microembossable layer, after applying the image intensifying layer or after applying the protective layer.

DETAILED DESCRIPTION OF THE INVENTION

Preliminarily, the microembossable coating disclosed and claimed herein may include any of the following combinations: (i) the cross-linked sealing layer and the microembossable layer; (ii) the cross-linked sealing layer, microembossable layer and image-intensifying layer; or (iii) the cross-linked sealing layer, microembossable layer, image-intensifying layer and protective layer. The embossing step may be conducted either before application of the image-intensifying layer, after application of the image-intensifying layer, or after application of the protective layer. Regardless when the embossing step is performed, it is understood that only the microembossable layer is embossed, and it is the microembossable layer which gives the microembossable coating its microembossable characteristic.

In the first embodiment, a microembossable coating for paper substrates contains: (i) a cross-linked sealing layer provided on the paper substrate, wherein the cross-linked sealing layer has a glass transition temperature above the embossing temperature; (ii) a microembossable layer provided on the sealing layer, wherein the microembossable layer comprises, in admixture, a) a cyclohexanone aldehyde resin, b) chlorinated rubber, c) a vinyl terpolymer resin and d) an antiblocking aid; (iii) an image intensifying layer provided on the microembossable layer; and (iv) a protective layer provided on the image intensifying layer.

The purpose of the cross-linked sealing layer is to inhibit melt flow into the paper substrate and, therefore, provide a base for the microembossable layer. The polymer glass transition temperature of the cross-linked sealing layer is sufficiently high, above the embossing temperature, to prevent polymer flow during the preheating and embossing processes and, therefore, the cross-linked sealing layer provides a stable surface that is smooth, of sufficiently high melting point, and enhances the properties of the embossing layer.

In general, any cross-linked sealing layer which has a glass transition temperature higher than the embossing temperature may be used. A preferred cross-linked sealing layer contains, in admixture, nitrocellulose, maleic modified rosin ester, urea formaldehyde resin, and a catalyst.

It is believed that these components in the cross-linked sealing layer function as follows. The nitrocellulose provides a very high adhesion to paper, and its very high softening point prevents deformation or flow of the sealing layer during future high temperature processing. In addition, it provides hydroxyl functionality suitable for cross-linking. The maleic rosin ester also provides high paper adhesion and heat resistance, is very compatible with nitrocellulose, provides carboxyl functionality for additional heat and solvent resistance, and maintains low viscosity at high solids for a more durable and heavier paper sealing. The urea formaldehyde provides cross-linking to the coating for high heat and solvent resistance in further processing, and its low temperature curability and rapid curing allow further processing of the material without a long oven curing step.

Catalysts are used in the cross-linked sealing layer for the purpose of increasing the rate of cure. Such catalysts include, for example, dinonylnaphthalene disulfonic acid, dodecyl benzene sulfonic acid, p-toluene sulfonic acid, oxalic acid, maleic acid, hexamic acid, phosphoric acid, phthalic acid, acrylic acid, and alkyl phosphate ester. A preferred catalyst is p-toluene sulfonic acid. When the p-toluene sulfonic acid is used, such is generally present in an amount of 2–5 percent of the total solids in the cross-linked sealing layer.

The nitrocellulose, maleic modified rosin ester, urea formaldehyde resin, and p-toluene sulfonic acid may be present in the cross-linked sealing layer in amounts of 1 part by weight of the total weight of the cross-linked sealing layer, 2 parts by weight of the total weight of the cross-linked sealing layer, 3 parts by weight of the total weight of the cross-linked sealing layer, and 2–5 percent of the total solids in the cross-linked sealing layer, respectively.

The cross-linked sealing layer containing nitrocellulose, maleic modified rosin ester, and urea formaldehyde resin, may be modified as follows: (1) the urea formaldehyde may be replaced with melamine resins such as hydroxypropyl-carbamylmethyl melamine, hexamethoxymethyl melamine, and butylated, and isobutylated melamine-formaldehyde resins; (2) the nitrocellulose may be replaced with thermoset acrylic resins such as hydroxyl functional, carboxyl functional, and amine functional acrylate and methacrylate polymers; and (3) the urea formaldehyde may also be replaced with isocyanate resins and polymers such as hexamethylene diisocyanate, isophorone diisocyanate, toluene diisocyanate, and diphenylmethane 4,4' diisocyanate.

Instead of the above combination of nitrocellulose, maleic modified rosin ester, urea formaldehyde resin, and a catalyst, the cross-linked sealing layer may contain radiation curable (UV or electron beam curable) monomers and oligomers in combination with a photosensitizer to provide a highly crosslinked, high Tg surface. Such radiation curable monomers/oligomers include mono and multifunctional acrylate and methacrylate monomers, urethane acrylates, epoxy acrylates, and elastomeric acrylates.

A preferred UV radiation curable sealing layer contains a monofunctional acrylate monomer, a trifunctional acrylate monomer, an epoxy acrylate oligomer, and a photosensitizer in amounts of 1 part by weight of the total weight of the sealing layer, 1 part by weight of the total weight of the sealing layer, 2.5 parts by weight of the total weight of the sealing layer, and 1 part by weight of the total weight of the sealing layer, respectively.

In general, the resin combinations in the cross-linked sealing layer may be applied to the paper substrate using a rotogravure process. Processes such as gap coating, rod coating and flexo printing can be employed. These processes are well-known to those skilled in the art (e.g., see Donatas Satas, "Web-Processing and Converting Technology and Equipment" (1984)).

Next, the microembossable layer of the first embodiment will be discussed. The microembossable layer of the first embodiment is provided on the cross-linked sealing layer and comprises, in admixture, a) a cyclohexanone aldehyde resin, b) chlorinated rubber, c) a vinyl terpolymer resin and d) an antiblocking aid.

In general, the a) cyclohexanone aldehyde resin, b) chlorinated rubber, c) vinyl terpolymer resin and d) antiblocking aid are present in amounts of 3 parts by weight, 2 parts by weight, 1 part by weight and 0.01 part by weight, respectively.

It is believed that these components in the microembossable layer of the first embodiment function as follows. The chlorinated rubber is an elastic polymer with good solubility and compatibility with other resins. This is a high temperature embossable resin that will withstand heat in additional processing without sacrificing gloss in the microembossable coating. The cyclohexanone aldehyde is a low viscosity resin that allows the coating solids to be increased without significantly altering the solution viscosity. This resin reduces the coating softening point to a reasonable temperature such that it is microembossable on conventional "soft" embossing equipment. The carboxyl vinyl terpolymer provides improved adhesion between the microembossable layer and the sealing layer and improved adhesion between the microembossable layer and the metal layer. Its low softening point also contributes to the microembossability of the microembossable layer.

Other polymers that can be employed in combination with the components in the microembossable layer of the first embodiment are styrene allyl alcohol resins in combination with vinyl butyral polymers. Such may be used in a ratio of 3:1, respectively. Other polymer combinations such as chlorinated rubber and polyvinylidine chloride acrylonitrile may also be used in a parts by weight ratio of 1:1. The total amount of these additional polymers in the microembossable layer is generally up to 50% of the total weight of the microembossable layer.

Preferred antiblocking aids that prevent the embossing shim or die from adhering or sticking to the embossing coating under heat and pressure are: (1) polyether modified silicones; (2) carbonol functional siloxanes; (3) fluorinated alkyl alkoxylate; (4) polytetrafluoroethylene; (5) pentahydroxy-tetradecanoato dichromium; (6) hydroxylated siloxanes; and (7) polyethylene waxes.

The foregoing antiblocking agents have been shown to exhibit antiblocking properties without sacrificing adhesion or bonding to the metal layer, and, in some cases, actually enhance bonding due to their inherent functionality.

Of the preferred antiblocking aids, the use of siloxanes is preferred. It is believed that the siloxanes provide slip and lubricity to the coating to prevent the coating from adhering to the embossing shim during microembossing, prevent offsetting of the coating within the roll between processes, and do not have any detrimental effects on metal adhesion to this layer. Of the siloxanes, the hydroxylated siloxanes are most preferred.

The siloxanes are present in a similar amount as other antiblocking aids. For example, the siloxanes are preferably present in an amount of 0.01 parts by weight of the total weight of the microembossable layer.

In general, the microembossable layer is applied to the cross-linked sealing layer using a rotogravure process. This is the same rotogravure process discussed above in regard to the cross-linked sealing layer.

The image intensifying layer may be either a metal layer or a transparent layer.

The metal layer may be aluminum, tin, gold, silver or chromium, or any other metal that can be deposited via vacuum vapor deposition, chemical vapor deposition or sputter coating. Preferably, the metal layer is a vacuum deposited aluminum layer. In general, the vacuum deposited aluminum layer has a thickness in a range of 200–400Å.

It is believed that the vacuum vapor deposited aluminum layer functions as follows. Such layer provides a highly reflective bright metal surface which enhances the appearance of the holographically microembossed surface. In addition, the vacuum vapor deposited aluminum preserves the microembossed holographic or diffraction image.

The foregoing metal layer follows the contours of the diffraction grating and coats the embossed diffraction grating evenly and uniformly by replicating the grating pattern. Subsequent wet coating processes such as, for example, involving the protective layer, will not void the image as it floods the surface of the metal layer during the coating process.

The transparent image intensifying layer may be a dielectric layer, optical coating, metal, metal oxide, or non-metal oxide layer such as silicon monoxide, silicon dioxide, aluminum oxide, magnesium fluoride, zinc sulfide, indium, tin tungsten oxide and mixtures thereof.

The transparent layer is applied in a similar manner as the metal layer.

Finally, the protective layer is provided on the image intensifying layer and preferably contains nitrocellulose and a vinyl terpolymer of vinyl chloride-vinyl acetate-hydroxy alkyl acetate. The ratio of the nitrocellulose to the vinyl terpolymer is preferably 2:1 parts by weight.

The protective layer provides a barrier to oxidation in the metal layer, as well as scuff and mar resistance. The protective layer is overprintable and will accept conventional printing ink.

In addition to the nitrocellulose and vinyl terpolymer in the protective layer, the protective layer may also contain antiblocking additives of the type disclosed in the microembossable layer, and can be employed to enhance abrasion and mar resistance. In addition, the protective layer can be modified with organic metal complex dyes or organic transparent pigments to impart a color to the coating.

In general, the protective layer is applied using the same rotogravure process as discussed above.

The coating weight of the cross-linked sealing layer, microembossable layer and protective layer can vary and is dependent upon the solids present in the coating and the method of application of the coating on to the substrate. Typical dry coating weights for each of these three layers is 1–3 g/m$^2$.

In the microembossable coating for paper substrates of the second embodiment, the cross-linked sealing layer, image intensifying layer and protective layer are similar to those in the first embodiment, but the microembossable layer contains: (a) at least one of methyl methacrylate or ethyl methacrylate; (b) polyvinyl acetate maleate copolymer; (c) carboxyl vinyl terpolymer; and d) an antiblocking aid.

In general, the at least one of methyl methacrylate or ethyl methacrylate, polyvinyl acetate maleate copolymer, carboxyl vinyl terpolymer and antiblocking aid are present in amounts of 4 parts by weight (this amount includes the total amount when methyl methacrylate and ethyl methacrylate are both used), 2 parts by weight, 1 part by weight, and 0.01 part by weight, respectively.

It is believed that the components in the microembossable layer of the second embodiment function as follows. The methyl methacrylate is a hard, film forming resin with a moderate to high softening point (Tg 105° C.) which influences the coating softening point and is highly compatible with the very soft polyvinyl acetate maleate copolymer. Ethyl methacrylate can be substituted when lower coating softening points are desired such as with coatings on heat sensitive films. These methacrylates increase the hardness of the coating to prevent offsetting in the roll. The polyvinyl acetate maleate copolymer is a highly elastic and low softening point resin, and significantly contributes to the soft microembossable properties of the microembossable layer. Without the methacrylate component, the polyvinyl acetate maleate copolymer is a very tacky resin, but with the methacrylate component, it is formulated to become non-tacky and hard at temperatures below the embossing conditions. The carboxyl vinyl terpolymer contributes to the adhesion between the microembossable layer and the sealing layer and between the microembossable layer and image intensifying layer.

The antiblocking aids of the microembossable layer of the second embodiment are similar to the antiblocking aids used in the first embodiment. For example, a preferred antiblocking aid is the use of siloxanes, preferably hydroxylated siloxanes, present in an amount of 0.01 part by weight of the microembossable layer.

Similar additives and amounts may be added to the microembossable layer of the second embodiment as discussed hereinabove regarding the microembossable layer of the first embodiment.

The microembossable layer in the second embodiment may also be applied using the rotogravure process discussed above.

The third embodiment of the present invention is a microembossed paper comprising a paper substrate and a microembossed coating provided thereon. The microembossed coating of the third embodiment contains the cross-linked sealing layer, microembossed layer (which is the microembossable layer after microembossing), image intensifying layer and protective layer of the first embodiment. These layers are arranged as follows: the cross-linked sealing layer is provided on the paper substrate; the microembossed layer is provided on the cross-linked sealing layer; the image intensifying layer is provided on the microembossed layer; and the protective layer is provided on the image intensifying layer.

The holographic or diffraction microembossed paper or plastic products can be commercially used in the manufacture of gift wrappings, labels, boxes, notebooks, packaging products, and any variety of other related applications.

The above products can be further processed by the application of a pressure sensitive adhesive or laminating adhesive to the paper side. In addition, the protective coated side of the holographically microembossed paper product can be commercially overprinted with four color process inks to provide text and images to enhance the holographic or diffraction image.

The fourth embodiment of the present invention is a microembossed paper comprising a paper substrate and a microembossed coating provided thereon. The microembossed coating of the fourth embodiment contains the cross-linked sealing layer, image intensifying layer and protective layer of the first embodiment, but contains a microembossed layer (which is the microembossable layer after microembossing) of the second embodiment. These layers are arranged as follows: the cross-linked sealing layer is provided on the paper substrate; the microembossed layer is provided on the cross-linked sealing layer; the image intensifying layer is provided on the microembossed layer; and the protective layer is provided on the image intensifying layer.

Finally, the process of the present invention for microembossing paper substrates comprises the steps of: (i) applying the above cross-linked sealing layer to a paper substrate; and (ii) applying a microembossable layer on the cross-linked sealing layer, wherein the microembossable layer comprises, in admixture, the microembossable layer of the first embodiment: a) a cyclohexanone aldehyde resin, b) chlorinated rubber, c) a vinyl terpolymer resin and d) an antiblocking aid; or the microembossable layer comprises, in admixture, the microembossable layer of the second embodiment: a) at least one member selected from the group consisting of methyl methacrylate and ethyl methacrylate, b) a polyvinyl acetate maleate copolymer, c) a carboxyl vinyl terpolymer, and d) an antiblocking aid. An image intensifying layer and protective layer as defined above are subsequently added thereto, and the embossing step is conducted after applying the microembossable layer, after applying the image intensifying layer or after applying the protective layer.

The microembossing process is generally well known, and is accomplished through heat and pressure. Typical embossing temperatures are in the range of 100°–135° C. In addition, typical embossing pressures are in the range of 200–400 pounds per linear inch.

Typical soft embossing pressures are in the range of 200–400 psi while pressures up to 2,000 psi are required for hard embossing. During the embossing process, a coated web is heated using, for example, a heated roller, infrared lamp, or hot air stream. The heated web passes between an embossing roller (covered with metal or plastic shims bearing the optical image) and backing roller (a hard material such as steel or hard silicone rubber is generally used). Either or both rollers may be heated. Elevated temperatures are required to bring the embossable coating to its softening point so that it will readily accept a holographic or diffraction image. Passing through the embossing nip, the coating is air-cooled or passed over a chill roller which freezes the image in place.

The paper substrates which can be used in each of the embodiments discussed herein may include, but are not limited to, clay coated papers such as coated one side or coated two sides litho as well as supercalendered paper.

The present invention is now described in more detail by reference to the following example, but it should be understood that the invention is not construed as being limited thereto. Unless otherwise indicated herein, all parts, percents, ratios and the like are by weight.

EXAMPLE 1

The cross-linked sealing layer was made containing 1 part by weight of a nitrocellulose resin, 2 parts by weight of a maleic modified resin ester, 3 parts by weight of a urea formaldehyde resin and 2–5% of a p-toluene sulfonic acid, based on total solids, dissolved in 2 parts butyl acetate, 2 parts ethyl acetate, 1 part MEK. The total solids of the solution were 34%. This coating was applied using a ceramic gravure cylinder with a 165 screening to a clay-coated one side calendered cellulose web. The web was passed through a drying tunnel at 200° F. at 200 feet/minute for 10 seconds. The dry weight of the coating was 3 g/m².

The microembossable layer, containing 3 parts by weight cyclohexanone aldehyde resin, 2 parts by weight chlorinated rubber, 1 part by weight vinyl terpolymer resin, and 1/100 parts by weight hydroxylated siloxane in 2 parts ethyl acetate, 1.5 parts butyl acetate, and 1 part MEK, was applied to the sealing layer. The 22% solids coating was applied using a ceramic engraved gravure cylinder with a 165 screening to yield a dry coating weight of 2 g/m². The solvents were dried in a 200° F. tunnel at 200 feet/minute for 10 seconds.

The coated paper was placed on a soft embossing machine. At 80 feet per minute, the paper was preheated to 300° F. prior to passing through a nip heated to 315° F. The nip consisted of a soft silicone rubber backing roller and an embossing roller covered with nickel diffraction shims. No offsetting of the coating was observed at embossing pressures of 200 psi.

The embossed roll was next vacuum metallized with a 300 Å thick layer of aluminum. Aluminum was applied under high vacuum at a rate of 800 feet/minute.

The metallized, embossed paper was coated with a protective layer containing 2 parts by weight nitrocellulose, 1 part by weight vinyl terpolymer, and 1% polytetrafluoroethylene based on total solids. The resins were dissolved in 6 parts MEK and 1 part diacetone alcohol to give a solution of 23% total solids. This solution was applied using an engraved ceramic gravure cylinder with a 200 screening at 200 feet/minute. The solvents were dried to 10 seconds in a 200° F. tunnel to yield a dry coating weight of 1 g/m².

The completed product was visually inspected and was found to exhibit a bright, vivid diffraction image with minimal graininess. Scotch 600 tape was applied to a 3" long area and allowed to rest for 3 seconds. When the tape was pulled from the paper, the paper fibers tore, indicating that all coatings exhibited excellent intercoat adhesion. Five rubs using dry Kromokote caused minimal damage to the protective layer.

While the invention has been described in detail and with reference to specific embodiments thereof, it will be apparent to one skilled in the art that various changes and modifications can be made therein without departing from the spirit and scope thereof.

What is claimed is:

1. A microembossed paper comprising a paper substrate and a microembossed coating, wherein said microembossed coating is provided on said paper substrate and said microembossed coating comprises:
   (i) a cross-linked sealing layer provided on said paper substrate, wherein said cross-linked sealing layer has a glass transition temperature above an embossing temperature;
   (ii) a microembossed layer provided on said cross-linked sealing layer, wherein said microembossed layer comprises, in admixture, a) a cyclohexanone aldehyde resin, b) chlorinated rubber; c) a vinyl terpolymer resin and d) an anti-blocking aid;
   (iii) an image intensifying layer provided on said microembossed layer; and
   (iv) a protective layer provided on said image intensifying layer.

2. The microembossed paper of claim 1, wherein said cross-linked sealing layer comprises, in admixture, a) nitrocellulose, b) a maleic modified rosin ester, c) a urea formaldehyde resin, and d) a catalyst.

3. The microembossed paper of claim 1, wherein said catalyst is p-toluene sulfonic acid.

4. The microembossed paper of claim 3, wherein said nitrocellulose, maleic modified rosin ester, urea formaldehyde resin and p-toluene sulfonic acid are present in amounts of 1 part by weight, 2 parts by weight, 3 parts by weight and 2–5 percent of total solids, respectively; and said cyclohexanone aldehyde resin, chlorinated rubber, vinyl terpolymer resin and anti-blocking aid are present in amounts of 3 parts by weight, 2 parts by weight, 1 part by weight and 0.01 part by weight, respectively.

5. The microembossed paper of claim 1, wherein said image intensifying layer is a metal layer.

6. The microembossed paper of claim 5, wherein said metal layer comprises a vacuum vapor deposited aluminum layer.

7. The microembossed paper of claim 1, wherein said image intensifying layer is a transparent layer.

8. The microembossed paper of claim 7, wherein said transparent layer comprises at least one member selected from the group consisting of silicon monoxide, silicon dioxide, aluminum oxide, magnesium fluoride, zinc sulfide, tin tungsten oxide and indium.

9. The microembossed paper of claim 1, wherein said protective layer comprises, in admixture, a) nitrocellulose and b) a vinyl terpolymer of vinyl chloride-vinyl acetate-hydroxy alkyl acrylate.

10. The microembossed paper of claim 1, wherein said antiblocking aid is a siloxane.

11. The microembossed paper of claim 10, wherein said siloxane is a hydroxylated siloxane.

12. The microembossed paper of claim 1, wherein said cross-linked sealing layer comprises, in admixture, a) nitrocellulose, b) a maleic modified rosin ester, c) a urea formaldehyde resin, and d) p-toluene sulfonic acid; said image intensifying layer is a metal layer comprising a vacuum vapor deposited aluminum layer; and said protective layer comprises, in admixture, a) nitrocellulose and b) a vinyl terpolymer of vinyl chloride-vinyl acetate-hydroxy alkyl acrylate.

13. A microembossed paper comprising a paper substrate and a microembossed coating, wherein said microembossed coating is provided on said paper substrate and said microembossed coating comprises:
   (i) a cross-linked sealing layer provided on said paper substrate, wherein said cross-linked sealing layer has a glass transition temperature above an embossing temperature;
   (ii) a microembossed layer provided on said cross-linked sealing layer, wherein said microembossed layer comprises, in admixture, a) at least one member selected from the group consisting of methyl methacrylate and ethyl methacrylate, b) polyvinyl acetate maleate copolymer, c) carboxyl vinyl terpolymer, and d) an antiblocking aid;
   (iii) an image intensifying layer provided on said microembossed layer; and
   (iv) a protective layer provided on said image intensifying layer.

14. The microembossed paper of claim 13, wherein said cross-linked sealing layer comprises, in admixture, a) nitrocellulose, b) a maleic modified rosin ester, c) a urea formaldehyde resin, and d) a catalyst.

15. The microembossed paper of claim 14, wherein said catalyst is p-toluene sulfonic acid.

16. The microembossed paper of claim 15, wherein said nitrocellulose, maleic modified rosin ester, urea formaldehyde resin and p-toluene sulfonic acid are present in amounts of 1 part by weight, 2 parts by weight, 3 parts by weight and 2–5 percent of total solids, respectively; and said i) methyl methacrylate, ethyl methacrylate or mixture thereof, ii) polyvinyl acetate maleate copolymer, iii) carboxyl vinyl terpolymer, and iv) antiblocking aid are present in amounts of 4 parts by weight, 2 parts by weight, 1 part by weight and 0.01 part by weight, respectively.

17. The microembossed paper of claim 13, wherein said image intensifying layer is a metal layer.

18. The microembossed paper of claim 17, wherein said metal layer comprises a vacuum vapor deposited aluminum layer.

19. The microembossed paper of claim 13, wherein said image intensifying layer is a transparent layer.

20. The microembossed paper of claim 19, wherein said transparent layer comprises at least one member selected from the group consisting of silicon monoxide, silicon dioxide, aluminum oxide, magnesium fluoride, zinc sulfide, tin tungsten oxide and indium.

21. The microembossed paper of claim 13, wherein said protective layer comprises, in admixture, a) nitrocellulose and b) a vinyl terpolymer of vinyl chloride-vinyl acetate-hydroxy alkyl acrylate.

22. The microembossed paper of claim 13, wherein said antiblocking aid is a siloxane.

23. The microembossed paper of claim 22, wherein said siloxane is a hydroxylated siloxane.

24. The microembossed paper of claim 23, wherein said cross-linked sealing layer comprises, in admixture, a) nitrocellulose, b) a maleic modified rosin ester, c) a urea formaldehyde resin, and d) p-toluene sulfonic acid; said image intensifying layer is a metal layer comprising a vacuum vapor deposited aluminum layer; and said protective layer comprises, in admixture, a) nitrocellulose and b) a vinyl terpolymer of vinyl chloride-vinyl acetate-hydroxy alkyl acrylate.

25. A process for microembossing paper substrates comprising the steps of:
  (i) applying a cross-linked sealing layer on a paper substrate, wherein said cross-linked sealing layer has a glass transition temperature above an embossing temperature;
  (ii) applying a microembossable layer on said cross-linked sealing layer, wherein said microembossable layer comprises, in admixture, a) a cyclohexanone aldehyde resin, b) chlorinated rubber; c) a vinyl terpolymer resin and d) an anti-blocking aid;
  (iii) applying an image intensifying layer on said microembossable layer;
  (iv) applying a protective layer on said image intensifying layer; and
  (v) embossing.

26. The process of claim 25, wherein said cross-linked sealing layer comprises, in admixture, a) nitrocellulose, b) a maleic modified rosin ester, c) a urea formaldehyde resin, and d) a catalyst.

27. The process of claim 26, wherein said catalyst is p-toluene sulfonic acid.

28. The process of claim 27, wherein said nitrocellulose, maleic modified rosin ester, urea formaldehyde resin and p-toluene sulfonic acid are present in amounts of 1 part by weight, 2 parts by weight, 3 parts by weight and 2–5 percent of total solids, respectively; and said cyclohexanone aldehyde resin, chlorinated rubber, vinyl terpolymer resin and anti-blocking aid are present in amounts of 3 parts by weight, 2 parts by weight, 1 part by weight and 0.01 part by weight, respectively.

29. The process of claim 25, wherein said image intensifying layer is a metal layer.

30. The process of claim 29, wherein said metal layer comprises a vacuum vapor deposited aluminum layer.

31. The process of claim 25, wherein said image intensifying layer is a transparent layer.

32. The process of claim 31, wherein said transparent layer comprises at least one member selected from the group consisting of silicon monoxide, silicon dioxide, aluminum oxide, magnesium fluoride, zinc sulfide, tin tungsten oxide and indium.

33. The process of claim 25, wherein said protective layer comprises, in admixture, a) nitrocellulose and b) a vinyl terpolymer of vinyl chloride-vinyl acetate-hydroxy alkyl acrylate.

34. The process of claim 25, wherein said antiblocking aid is a siloxane.

35. The process of claim 34, wherein said siloxane is a hydroxylated siloxane.

36. The process of claim 25, wherein said cross-linked sealing layer comprises, in admixture, a) nitrocellulose, b) a maleic modified rosin ester, c) a urea formaldehyde resin, and d) p-toluene sulfonic acid; said image intensifying layer is a metal layer comprising a vacuum vapor deposited aluminum layer; and said protective layer comprises, in admixture, a) nitrocellulose and b) a vinyl terpolymer of vinyl chloride-vinyl acetate-hydroxy alkyl acrylate.

37. A process for microembossing paper substrates comprising the steps of:
  (i) applying a cross-linked sealing layer on said paper substrate, wherein said cross-linked sealing layer has a glass transition temperature above an embossing temperature;
  (ii) applying a microembossable layer on said sealing layer, wherein said microembossable layer comprises, in admixture, a) at least one member selected from the group consisting of methyl methacrylate and ethyl methacrylate, b) polyvinyl acetate maleate copolymer, c) carboxyl vinyl terpolymer, and d) an antiblocking aid;
  (iii) applying an image intensifying layer on said microembossable layer;
  (iv) applying a protective layer on said image intensifying layer; and
  (v) embossing.

38. The process of claim 37, wherein said cross-linked sealing layer comprises, in admixture, a) nitrocellulose, b) a maleic modified rosin ester, c) a urea formaldehyde resin, and d) a catalyst.

39. The process of claim 38, wherein said catalyst is p-toluene sulfonic acid.

40. The process of claim 39, wherein said nitrocellulose, maleic modified rosin ester, urea formaldehyde resin and p-toluene sulfonic acid are present in amounts of 1 part by weight, 2 parts by weight, 3 parts by weight and 2–5 percent of total solids, respectively; and said i) methyl methacrylate, ethyl methacrylate or mixture thereof, ii) polyvinyl acetate maleate copolymer, iii) carboxyl vinyl terpolymer, and iv) antiblocking aid are present in amounts of 4 parts by weight, 2 parts by weight, 1 part by weight and 0.01 part by weight, respectively.

41. The process of claim 37, wherein said image intensifying layer is a metal layer.

42. The process of claim 41, wherein said metal layer comprises a vacuum vapor deposited aluminum layer.

43. The process of claim 37, wherein said image intensifying layer is a transparent layer.

44. The process of claim 43, wherein said transparent layer comprises at least one member selected from the group consisting of silicon monoxide, silicon dioxide, aluminum oxide, magnesium fluoride, zinc sulfide, tin tungsten oxide and indium.

45. The process of claim 37, wherein said protective layer comprises, in admixture, a) nitrocellulose and b) a vinyl terpolymer of vinyl chloride-vinyl acetate-hydroxy alkyl acrylate.

46. The process of claim 37, wherein said antiblocking aid is a siloxane.

47. The process of claim 46, wherein said siloxane is a hydroxylated siloxane.

48. The process of claim 37, wherein said cross-linked sealing layer comprises, in admixture, a) nitrocellulose, b) a maleic modified rosin ester, c) a urea formaldehyde resin, and d) p-toluene sulfonic acid; said image intensifying layer is a metal layer comprising a vacuum vapor deposited aluminum layer; and said protective layer comprises, in admixture, a) nitrocellulose and b) a vinyl terpolymer of vinyl chloride-vinyl acetate-hydroxy alkyl acrylate.

49. The microembossable coating of claim 1, wherein said cross-linked sealing layer is a UV radiation curable sealing layer comprising a monofunctional acrylate monomer, a trifunctional acrylate monomer, an epoxy acrylate oligomer, and a photosensitizer in amounts of 1 part by weight, 1 part by weight, 2.5 parts by weight, and 1 part by weight, respectively.

50. The microembossable coating of claim 37, wherein said cross-linked sealing layer is a UV radiation curable sealing layer comprising a monofunctional acrylate monomer, a trifunctional acrylate monomer, an epoxy acrylate oligomer, and a photosensitizer in amounts of 1 part by weight, 1 part by weight, 2.5 parts by weight, and 1 part by weight, respectively.

51. The microembossed paper of claim 1, wherein said cross-linked sealing layer is a UV radiation curable sealing layer comprising a monofunctional acrylate monomer, a trifunctional acrylate monomer, an epoxy acrylate oligomer, and a photosensitizer in amounts of 1 part by weight, 1 part by weight, 2.5 parts by weight, and 1 part by weight, respectively.

52. The microembossed paper of claim 13, wherein said cross-linked sealing layer is a UV radiation curable sealing layer comprising a monofunctional acrylate monomer, a trifunctional acrylate monomer, an epoxy acrylate oligomer, and a photosensitizer in amounts of 1 part by weight, 1 part by weight, 2.5 parts by weight, and 1 part by weight, respectively.

53. The process of claim 25, wherein said cross-linked sealing layer is a UV radiation curable sealing layer comprising a monofunctional acrylate monomer, a trifunctional acrylate monomer, an epoxy acrylate oligomer, and a photosensitizer in amounts of 1 part by weight, 1 part by weight, 2.5 parts by weight, and 1 part by weight, respectively.

54. The process of claim 37, wherein said cross-linked sealing layer is a UV radiation curable sealing layer comprising a monofunctional acrylate monomer, a trifunctional acrylate monomer, an epoxy acrylate oligomer, and a photosensitizer in amounts of 1 part by weight, 1 part by weight, 2.5 parts by weight, and 1 part by weight, respectively.

55. A process for microembossing paper substrates comprising the steps of:

(i) applying a cross-linked sealing layer on a paper substrate, wherein said cross-linked sealing layer has a glass transition temperature above an embossing temperature;

(ii) applying a microembossable layer on said cross-linked sealing layer, wherein said microembossable layer comprises, in admixture, a) a cyclohexanone aldehyde resin, b) chlorinated rubber; c) a vinyl terpolymer resin and d) an anti-blocking aid;

(iii) embossing the microembossable layer to produce a microembossed layer;

(iv) applying an image intensifying layer on said microembossed layer; and (v) applying a protective layer on said image intensifying layer.

56. A process for microembossing paper substrates comprising the steps of:

(i) applying a cross-linked sealing layer to a paper substrate, wherein said cross-linked sealing layer has a glass transition temperature above an embossing temperature;

(ii) applying a microembossable layer on said sealing layer, wherein said microembossable layer comprises, in admixture, a) at least one member selected from the group consisting of methyl methacrylate and ethyl methacrylate, b) polyvinyl acetate maleate copolymer, c) carboxyl vinyl terpolymer, and d) an antiblocking aid;

(iii) embossing said microembossable layer to produce a microembossed layer;

(iv) applying an image intensifying layer on said microembossed layer; and (v) applying a protective layer on said image intensifying layer.

57. A process for microembossing paper substrates comprising the steps of:

(i) applying a cross-linked sealing layer on a paper substrate, wherein said cross-linked sealing layer has a glass transition temperature above an embossing temperature;

(ii) applying a microembossable layer on said cross-linked sealing layer, wherein said microembossable layer, comprises, in admixture, a) a cyclohexanone aldehyde resin, b) chlorinated rubber; c) a vinyl terpolymer resin and d) an anti-blocking aid;

(iii) applying an image intensifying layer on said microembossable layer;

(iv) embossing; and (v) applying a protective layer on said image intensifying layer.

58. A process for microembossing paper substrates comprising the steps of:

(i) applying a cross-linked sealing layer to a paper substrate, wherein said cross-linked sealing layer has a glass transition temperature above an embossing temperature;

(ii) applying a microembossable layer on said sealing layer, wherein said microembossable layer comprises, in admixture, a) at least one member selected from the group consisting of methyl methacrylate and ethyl methacrylate, b) polyvinyl acetate maleate copolymer, c) carboxyl vinyl terpolymer, and d) an antiblocking aid;

(iii) applying an image intensifying layer on said microembossable layer;

(iv) embossing; and (v) applying a protective layer on said image intensifying layer.

59. The process of claim 55, wherein said cross-linked sealing layer comprises, in admixture, a) nitrocellulose, b) a maleic modified rosin ester, c) a urea formaldehyde resin, and d) a catalyst.

60. The process of claim 56, wherein said cross-linked sealing layer comprises, in admixture, a) nitrocellulose, b) a maleic modified rosin ester, c) a urea formaldehyde resin, and d) a catalyst.

61. The process of claim 57, wherein said cross-linked sealing layer comprises, in admixture, a) nitrocellulose, b) a maleic modified rosin ester, c) a urea formaldehyde resin, and d) a catalyst.

62. The process of claim 58, wherein said cross-linked sealing layer comprises, in admixture, a) nitrocellulose, b) a maleic modified rosin ester, c) a urea formaldehyde resin, and d) a catalyst.

* * * * *